(12) United States Patent
Holzer

(10) Patent No.: US 8,560,160 B2
(45) Date of Patent: Oct. 15, 2013

(54) ADAPTIVE CENTRAL MAINTENANCE SYSTEM AND METHOD FOR PLANNING MAINTENANCE OPERATION FOR SYSTEMS

(75) Inventor: Werner Holzer, Buxtehude (DE)

(73) Assignee: Airbus Operations GmbH (DE)

( * ) Notice: Subject to any disclaimer, the term of this patent is extended or adjusted under 35 U.S.C. 154(b) by 148 days.

(21) Appl. No.: 13/140,267

(22) PCT Filed: Dec. 17, 2009

(86) PCT No.: PCT/EP2009/067452
§ 371 (c)(1),
(2), (4) Date: Jul. 19, 2011

(87) PCT Pub. No.: WO2010/070070
PCT Pub. Date: Jun. 24, 2010

(65) Prior Publication Data
US 2011/0270482 A1    Nov. 3, 2011

Related U.S. Application Data

(60) Provisional application No. 61/201,932, filed on Dec. 17, 2008.

(30) Foreign Application Priority Data

Dec. 17, 2008 (DE) .......................... 10 2008 062 630

(51) Int. Cl.
*G06F 11/30* (2006.01)
(52) U.S. Cl.
USPC .......... 701/29.4; 235/439; 235/449; 429/143; 429/147
(58) Field of Classification Search
USPC ................. 701/29, 29.4; 340/30, 571.1, 945; 235/439, 449; 429/143, 147; 700/79; 714/3, 37; 62/238.3
See application file for complete search history.

(56) References Cited

U.S. PATENT DOCUMENTS 5,463,768 A    10/1995   Cuddihy et al.
5,852,814 A    12/1998   Allen
(Continued)

FOREIGN PATENT DOCUMENTS

DE          10153151 A1      5/2003
DE       102007013324 A1    10/2008
(Continued)

OTHER PUBLICATIONS

William G. Fenton et al: "Fault Diagnosis of Electronic Systems Using Intelligent Techniques: A Review" 31(3); 269-281 (2001).

(Continued)

*Primary Examiner* — McDieunel Marc
(74) *Attorney, Agent, or Firm* — Lerner, David, Littenberg, Krumholz & Mentlik, LLP

(57) ABSTRACT

A maintenance system for generating maintenance instructions for at least one system, the maintenance system having a plurality of system components set up to receive operating data for a system from a central control unit of the system, to use said data to identify a fault of a system component, to compare the fault with predefined known faults and to retrieve maintenance operations which have already been carried out or are predefined and are correlated with the known faults from a main memory and to select a maintenance operation which correlates with the identified fault in order to rectify the fault and to output the operation as a maintenance instruction. A method for planning maintenance operations has steps of monitoring the systems for faults and generating a maintenance instruction.

16 Claims, 9 Drawing Sheets

(56) References Cited

U.S. PATENT DOCUMENTS

| | | | |
|---|---|---|---|
| 7,609,174 B2 * | 10/2009 | Tengler et al. | 340/905 |
| 7,747,382 B2 * | 6/2010 | Small et al. | 701/120 |
| 7,761,200 B2 * | 7/2010 | Avery et al. | 701/29.3 |
| 7,783,507 B2 * | 8/2010 | Schick et al. | 705/7.11 |
| 7,791,473 B2 * | 9/2010 | Allen et al. | 340/539.22 |
| 7,813,871 B2 * | 10/2010 | Small et al. | 701/120 |
| 7,983,809 B2 * | 7/2011 | Kell et al. | 701/29.3 |
| 8,019,504 B2 * | 9/2011 | Jamrosz et al. | 701/32.1 |
| 8,090,462 B2 * | 1/2012 | Wininger et al. | 700/100 |
| 8,165,826 B2 * | 4/2012 | Schimert et al. | 702/34 |
| 2003/0083794 A1 | 5/2003 | Halm et al. | |
| 2008/0230608 A1 | 9/2008 | Lallemang | |
| 2008/0252459 A1 | 10/2008 | Butler et al. | |

FOREIGN PATENT DOCUMENTS

| | | |
|---|---|---|
| EP | 0304848 A2 | 3/1989 |
| EP | 1703449 A1 | 9/2006 |
| WO | 2008012486 A1 | 1/2008 |

OTHER PUBLICATIONS

Christiane Gresse von Wangenheim: "Case-based Reasonings—A Short Introduction", 7 pages (2000).

Liang Tang et al: "An Intelligent Agent-Based Self-Evolving Maintenance and Operations Reasoning System" 14 pages (2005).

* cited by examiner

| | | | FC 1 | FC 2 | FC 3 | FC 4 | FC 5 | FC 6 | FC 7 | FC 8 | FC 9 |
|---|---|---|---|---|---|---|---|---|---|---|---|
| Effect | E1 | Loss of function 1 | x | | | | | | | | |
| | E2 | Loss of function 2 | | x | | | | | | | |
| | E3 | Loss of function 3 | | | x | | | | | | |
| | E4 | Loss of function 4 | | | | x | | | | | |
| | E5 | Loss of function 5 | | | | | x | | | | |
| | E6 | Loss of function 6 | | | | | | x | | | |
| | E7 | Loss of function 7 | | | | | | | x | | |
| | E8 | Loss of function 8 | | | | | | | | | |
| Fault symptom | F1 | Fault symptom 1 | x | | | | | | x | | |
| | F2 | Fault symptom 2 | | | x | | | | | | |
| | F3 | Fault symptom 3 | | | | x | | | | | |
| | F4 | Fault symptom 4 | | x | | | | | | | x |
| | F5 | Fault symptom 5 | | | x | | | | | | |
| | F6 | Fault symptom 6 | | | | | x | | | | |
| | F7 | Fault symptom 7 | | | | | | x | | | |
| | F8 | Fault symptom 8 | | | | | | | x | | |
| | F9 | Fault symptom 9 | x | | | | | | | | |
| | F10 | Fault symptom 10 | | | | | | | | | x |
| | F11 | Fault symptom 11 | | | x | | | | | | |
| | F12 | Fault symptom 12 | | | | | | x | | | |
| | F13 | Fault symptom 13 | | | | x | | | | | |
| | F14 | Fault symptom 14 | | x | | | | | | | |
| | F15 | Fault symptom 15 | | | | | x | | | | |
| | F16 | Fault symptom 16 | | | | | | | | x | |
| | | Fault | FC 1 | FC 2 | FC 3 | FC 4 | FC 5 | FC 6 | FC 7 | FC 8 | FC 9 |

Fig. 2

| | Fault | Faultless after replacement of | Rating | | | | Maintenance information | Alternatives | |
|---|---|---|---|---|---|---|---|---|---|
| | | | LRU A (FIN A) | LRU B (FIN B) | LRU C (FIN C) | Wiring | | | |
| 1 | | | 1 | 0 | 0 | 0 | Replacement of LRU A | | ←50 |
| 2 | FC 1 | LRU A | 3 | 0 | 0 | 0 | Replacement of LRU A | | ←52 |
| 3 | FC 1 | LRU B | 2 | 2 | 0 | 0 | Replacement of LRU A or LRU B | | ←54 |
| 4 | FC 1 | LRU A | 4 | 1 | 0 | 0 | Replacement of LRU A | LRU B | ←56 |
| 5 | FC 1 | LRU B | 3 | 3 | 0 | 0 | Replacement of LRU A or LRU B | | ←58 |
| 6 | FC 1 | LRU B | 2 | 4 | 0 | 0 | Replacement of LRU B | LRU A | ←60 |
| 7 | FC 1 | Wiring | 1 | 3 | 0 | 2 | Replacement of LRU B | Wiring, LRU A | ←62 |
| 8 | FC 1 | Wiring | 1 | 2 | 0 | 4 | Check wiring | LRU B, LRU A | ←64 |
| 9 | FC 1 | Wiring | 1 | 1 | 0 | 4 | Check wiring | LRU B, LRU A | ←66 |
| 10 | FC 1 | LRU B | 1 | 3 | 0 | 3 | Check wiring or Replacement of LRU B | LRU A | ←68 |
| 11 | FC 1 | LRU B | 1 | 4 | 0 | 2 | Replacement of LRU B | Wiring, LRU A | ←70 |

Fig. 3

| Fault | Rating | | | | | | | | | Maintenence information | Alternatives |
|---|---|---|---|---|---|---|---|---|---|---|---|
| | LRU A (FIN A) | LRU B (FIN B) | LRU C | LRU D | LRU E | LRU F | LRU G | LRU H | Wiring | | |
| FC 1 | 1 | 0 | 0 | 0 | 0 | 0 | 0 | 0 | 0 | Replacement of LRU A | |
| FC 2 | 0 | 0 | 1 | 0 | 0 | 0 | 0 | 0 | 0 | Replacement of LRU C | |
| FC 3 | 0 | 1 | 0 | 0 | 0 | 0 | 0 | 0 | 0 | Replacement of LRU B | |
| FC 4 | 0 | 0 | 0 | 1 | 0 | 0 | 0 | 0 | 0 | Replacement of LRU D | |
| FC 5 | 0 | 0 | 0 | 0 | 1 | 0 | 0 | 0 | 0 | Replacement of LRU E | |
| FC 6 | 0 | 1 | 0 | 0 | 0 | 0 | 0 | 0 | 0 | Replacement of LRU B | |
| FC 7 | 0 | 0 | 0 | 0 | 0 | 1 | 0 | 0 | 0 | Replacement of LRU F | |
| FC 8 | 0 | 0 | 0 | 0 | 0 | 0 | 1 | 0 | 0 | Replacement of LRU G | |
| FC 9 | 1 | 0 | 0 | 0 | 0 | 0 | 0 | 0 | 0 | Replacement of LRU A | |
| FC 10 | 0 | 0 | 0 | 0 | 0 | 0 | 0 | 1 | 0 | Replacement of LRU H | |
| FC 11 | 0 | 0 | 1 | 0 | 0 | 0 | 0 | 0 | 0 | Replacement of LRU C | |

| Fault | Rating | | | | | | | | | Maintenance information | Alternatives |
|---|---|---|---|---|---|---|---|---|---|---|---|
| | LRU A | LRU B | LRU C | LRU D | LRU E | LRU F | LRU G | LRU H | Wiring | | |
| FC 1 | 4 | 0 | 0 | 0 | 0 | 0 | 0 | 0 | 0 | Replacement of LRU A | |
| FC 2 | 0 | 0 | 3 | 1 | 0 | 0 | 0 | 0 | 0 | Replacement of LRU C | LRU D |
| FC 3 | 0 | 1 | 0 | 0 | 0 | 0 | 0 | 0 | 0 | Replacement of LRU B | |
| FC 4 | 0 | 0 | 0 | 1 | 0 | 0 | 0 | 0 | 0 | Replacement of LRU D | |
| FC 5 | 0 | 0 | 0 | 0 | 1 | 0 | 0 | 0 | 0 | Replacement of LRU E | |
| FC 6 | 0 | 4 | 0 | 0 | 0 | 0 | 0 | 0 | 0 | Replacement of LRU B | |
| FC 7 | 0 | 0 | 0 | 0 | 0 | 2 | 2 | 0 | 0 | Replacement of LRU F or LRU G | |
| FC 8 | 0 | 0 | 0 | 0 | 0 | 0 | 1 | 0 | 0 | Replacement of LRU G | |
| FC 9 | 1 | 0 | 0 | 0 | 0 | 0 | 0 | 0 | 3 | Check wiring | LRU A |
| FC 10 | 0 | 0 | 0 | 0 | 0 | 0 | 0 | 3 | 0 | Replacement of LRU H | |
| FC 11 | 0 | 0 | 1 | 0 | 0 | 0 | 0 | 0 | 0 | Replacement of LRU C | |

ADAPTIVE CENTRAL MAINTENANCE SYSTEM AND METHOD FOR PLANNING MAINTENANCE OPERATION FOR SYSTEMS

CROSS-REFERENCE TO RELATED APPLICATIONS

This application is a national phase entry under 35 U.S.C. §371 of International Application No. PCT/EP2009/067452, filed Dec. 17, 2009, published in German, which claims the benefit of the fling date of U.S. Provisional Patent Application No. 61/201,932, filed Dec. 17, 2008, and German Patent Application No. 10 2008 062 630.9, filed Dec. 17, 2008, the entire disclosures of which are hereby incorporated herein by reference.

TECHNICAL FIELD

The invention pertains to an adaptive central maintenance system for systems and a method for planning maintenance operations in systems.

BACKGROUND OF THE INVENTION

The presented invention is described below with exemplary reference to an aircraft and, more specifically, with exemplary reference to systems and system networks in an aircraft. However, it should already be noted at this point that the presented invention is by no means limited to the application in aircraft, but rather is suitable for use in all types of systems that comprise more or less complex system components and are located in any vehicles, objects, machines or the like.

The peculiarity with respect to aircraft systems can be seen in that many system components are realized in the form of so-called "Line Replacement Units" (LRU) that allow a replacement within a short stopover on the ground of no less than about two hours. In this way, a high level of utilization of the aircraft can be achieved and required maintenance does not necessarily lead to an immediate and prolonged standstill.

In order to simplify maintenance operations, modern commercial aircraft frequently comprise a central maintenance system (also referred to as "Central Maintenance System (CMS)") that receives maintenance information from systems within the aircraft if faults or failures occur within one or more systems. The function of the central maintenance system consists of providing a maintenance team with maintenance information or maintenance advice. Such maintenance information contains a listing of potential system components that need to be replaced in order to restore a function that can no longer be performed. Ideally, only a single system component to be replaced is specified. In complex systems, however, the system component responsible for a detected fault frequently cannot be directly determined. Accordingly, the maintenance information may also specify several system components to be replaced or possibly an incorrect system component to be replaced. This could lead to an incorrect system component being removed from the aircraft. The removed system component is inspected by a certified technician who may then determine that the removed system component is completely intact and operational. Subsequently, another system component of the aircraft needs to be replaced and inspected. The costs for inspecting the respective system components are very high, particularly with respect to aircraft systems, because repairs or inspections of this type can only be carried out by a competent technician in compliance with all approval regulations. The faultless state of an inspected system component is also referred to as "No Fault Found (NFF)" below.

In known maintenance systems, it is furthermore common practice that the maintenance messages transmitted to a maintenance team can be statically reproduced such that the same system component to be replaced is always suggested when a certain fault is detected. Consequently, the proportion of removed system components with the state NFF (faultless) can be quite high in known maintenance systems, particularly if the respective system is complex and comprises many interacting system components that make it difficult to determine the cause of the fault.

DE 101 53 151 A1 and US 2003 083 794 A1 pertain to a diagnostic system for facilitating the maintenance of a commercial aircraft, wherein at least one sensor device for generating and storing sensor signals is provided at least at one inspection point in order to diagnose faults on high-maintenance aircraft systems, and wherein the sensor signals can be transmitted to a processing unit and the processing unit is functionally connected to a display device that displays the sensor signals and/or the determined diagnostic information.

SUMMARY OF THE INVENTION

An object of the invention could consist of proposing a central maintenance system that can determine the most precise information possible on defective system components and display this information to the maintenance personnel such that the proportion of removed faultless system components is minimized.

Another object of the invention could consist of proposing a method for planning maintenance operations, in which the proportion of removed faultless system components is minimized This object is met by a central maintenance system having the features of independent claim 1. Advantageous additional developments are disclosed in the dependent claims.

At the beginning of the detailed description of the invention, several fundamental terms are defined. The term failure ("Failure") describes a state of an element, in which said element is unable to fulfill a desired function within predetermined limits A fault ("Fault"), in contrast, is considered a physical degradation of a system component that could lead to a failure. The failure of a system can be detected based on symptomatic faults.

In the following description, it is assumed that a system to be monitored comprises one or several central control units that is/are able to detect faults and to communicate these faults to a central maintenance system. This central control unit is connected to the system components.

The system components may be realized in any way and form part of the following incomplete list:
  simple analog sensors such as analog temperature sensors;
  intelligent sensors with integrated microprocessors such as humidity sensors;
  simple electric actuators;
  intelligent actuators comprising position sensors;
  heating devices;
  local control units of a distributed control system with distributed intelligence;
  coding and decoding devices that can convert analog signals into digital data and vice versa such as, for example, analog signals into TCP/IP data streams or devices of this type that transcode data streams such as CAN-data into ADFX-data;

data concentrators that collect the data of different system components and forward this data to different data receivers via a network;

network elements such as, for example, firewalls or switches in general.

The connection to the central control unit could be realized, for example, with the following options, wherein this list should not be interpreted as being complete:

discrete wiring that serves, for example, for transmitting discrete states (on/off, 0/1, etc.) such as, e.g., an open/closed circuit;

analog connection such as, for example, a temperature sensor control circuit or actuator command control circuit;

digital connection, for example, via a network or bus systems such as ARINS 429, CAN, ADFX or Ethernet.

Operational data and maintenance data can be transmitted via the data link between the system components and the central control unit.

According to a first aspect of the present invention, a central maintenance system according to the invention is realized in an adaptive fashion such that it is able to "learn" from maintenance operations that were already carried out and, in view of this fact, dynamically adapt maintenance information for a maintenance team. If a fault is detected in a system of the aircraft and transmitted to the central maintenance system according to the invention, the central maintenance system c according to the invention an determine which system component of the system could be defective due to a connection to one or more configuration systems, namely based on configuration tables. A configuration system of this type is realized in the form of a database of sorts and designed for determining in real time which system components are or were replaced, wherein such a configuration system is, at least in aircraft made by AIRBUS, also referred to as "Data Loading and Configuration System" (DLCS).

The configuration system is designed, in particular, for registering all system components of a system and for outputting information on system components upon request, e.g., when an identification number of a system component is transmitted.

A central maintenance system according to the invention comprises at least one arithmetic unit that is provided with a central processor unit, a random access memory and input/output means. The maintenance system according to the invention is respectively connected to the at least one control unit of the system to be monitored via the input/output means in order to receive information on potential faults. The central maintenance system according to the invention is furthermore connected to, among other things, the configuration system via the input/output means and designed for retrieving configuration data of the system with information on all system components from the configuration system when a fault is detected and transmitted to the central maintenance system according to the invention.

According to an aspect of the invention, the arithmetic unit preferably is designed for allocating symptomatic faults to one or more system components of the system to be monitored with the aid of corresponding allocation tables that may be stored in the random access memory of the maintenance system according to the invention. Since a fault detected by a system usually can be caused by different system components, particularly in complex systems, it may also occur that several causes for the occurred fault are taken into consideration in the allocation table.

This is the reason why the arithmetic unit of the central maintenance system according to the invention preferably is designed for identifying the respective system when fault data is received. If the central maintenance system is connected to a plurality of systems via their central control units, this is an important and necessary characteristic of the central maintenance system.

According to an advantageous embodiment, the maintenance system according to the invention also comprises one or more central control units that are arranged on or in the system components to be monitored or connected thereto via a data link. The advantages of central control units described above and below with reference to monitoring, fault detection, communication with the central maintenance system according to the present invention and the like therefore also apply accordingly to the maintenance system according to the invention.

In a preferred additional development of the central maintenance system according to the invention, the arithmetic unit is furthermore designed for identifying a fault that could be apparent in a map of a fault table in the random access memory of the arithmetic unit.

In another preferred embodiment, the arithmetic unit is designed for storing fault data, wherein the fault data preferably can be linked with occurring or occurred faults. Fault data of this type could prove useful in the case of a simple or more in-depth fault correction with complex faults.

The arithmetic unit of the central maintenance system according to the invention furthermore is preferably designed for identifying a maintenance operation to be carried out which could lead to a detected fault being corrected. This could be realized by comparing the fault with a map of a fault table and a rating table linked thereto, wherein maintenance operations that were already successfully or unsuccessfully carried out are correlated with occurred faults in the rating table.

Such a rating table could correlate data on faults, actions carried out to correct faults, maintenance information to be generated and alternative maintenance information with one another. The quality of the maintenance information being generated is improved due to a certain maintenance history. For example, if a certain fault occurred and was corrected by replacing a certain system component, a higher rating is allocated to the replacement of this corresponding system component than to the replacement of an alternative system component. However, if the replacement of a system component did not correct a detected fault, a lower rating can be allocated to the replacement of this respective system component. Due to such a method, an central maintenance system according to the invention is able to provide maintenance information of higher quality than that realized by means of a static system without the influence of a maintenance history.

It is furthermore preferred that the arithmetic unit of the central maintenance system according to the invention is designed for storing maintenance or repair operations or the corresponding maintenance information for all faults, e.g., in a volatile memory such as, for example, the random access memory or a non-volatile storage medium. When a fault is detected, the maintenance information can be displayed to the maintenance personnel such that the maintenance operations can be carried out.

Another preferred embodiment of the central maintenance system according to the invention is designed for transferring maintenance information via the input/output means, namely an onboard maintenance terminal that also referred to as "Onboard Maintenance Terminal (OMT)" such that it can be correspondingly displayed to the maintenance personnel on this terminal.

The arithmetic unit preferably is furthermore designed for identifying a corresponding system based on received configuration data. Due to this measure, the configuration system connected to the central maintenance system according to the invention can send a requested dataset that comprises, for example, several identification numbers to the arithmetic unit such that the arithmetic unit can subsequently determine with absolute certainty the system, to which this dataset belongs. This is particularly important in complex system networks, wherein more than 100 systems may, for example, be connected to a central maintenance system in modern commercial aircraft. Several datasets that are sent to the central maintenance system according to the invention by the configuration system can then be correspondingly allocated to the respective systems.

The arithmetic unit of the central maintenance system according to the invention preferably is designed for determining whether a system component in the respectively identified system has been replaced based on a received dataset of the configuration system. This makes it possible to simultaneously determine whether a fault that occurred prior to the replacement has been corrected by replacing the system component. This determination of a performed replacement can be realized by comparing the dataset of the configuration system with a previously received dataset or by identifying an identification number or the like that represents a performed replacement of a system component in the respective dataset. The determination of a corrected fault can be realized by correlating system status data with system configuration data. A corresponding correlation algorithm could furthermore output a rating of the performed maintenance action.

In a preferred additional development of the central maintenance system according to the invention, the arithmetic unit is designed for updating a rating table, in which faults are correlated with successful and unsuccessful maintenance operations, after it is determined that a maintenance operation was successful. This means that ratings in the rating table always take into account the latest findings that result in the faultless function of the system or system networks.

The central maintenance system according to the invention is furthermore designed for prompting maintenance personnel to validate a determined change in a maintenance strategy after an update of a rating table. This would make it possible to prevent clearly incorrect conclusions being drawn from successful maintenance operations, for example, with respect to a defective central control unit of a system and the clearly nonsensical correlations resulting thereof.

The central maintenance system according to the invention furthermore is preferably designed for exporting maintenance strategies and up-to-date rating tables with the correlation of successful and unsuccessful maintenance operations, as well as faults, to an external database unit, central maintenance systems for other composite systems and the like. In case the aspects of the invention are utilized in commercial aircraft, it would be conceivable to transfer data from an onboard central maintenance system of a commercial aircraft to a database unit on the ground that, in turn, is designed for comparing maintenance strategies of several commercial aircraft with one another and therefore is able to communicate particularly promising maintenance strategies to all commercial aircraft connected to the database unit.

Accordingly, it is particularly preferred that the central maintenance system according to the invention is designed for being updated by externally supplied data such that the best maintenance strategy possible is always available based on already known correlations of faults and successful and unsuccessful repair operations from other central maintenance systems.

In another advantageous additional development, the central maintenance system is designed for extracting information of a successful replacement of system components from an electronic log. An electronic log contains a collection of complaints and the consequent maintenance operations including reference numbers from a maintenance handbook ("Trouble Shooting Manual," TSM), reference numbers of performed removals and installations of system components, etc.

An advantageous embodiment of the central maintenance system according to the invention could comprise communication means that make it possible to export or import data for maintenance strategies in order to transmit or import advantageous maintenance strategies to/from a database unit. In the implementation of the central maintenance system according to the invention, a communication means could be realized in the form of a wire-bound data link or a wireless data link established between an aircraft and a ground station, a database unit in an airport gate or the like.

Since the central maintenance system generally also represents a system component of a complex system such as, for example, a vehicle, a preferred central maintenance system according to the invention ultimately also comprises an RFID tag that serves for its identification.

The object of the invention is furthermore met by a method for planning maintenance operations. In the method according to the invention, an aforementioned rating table could comprise points for individual maintenance operations that are increased or decreased by a certain amount depending on the successful or unsuccessful result of a maintenance operation. The aim is to automatically prefer a future maintenance operation for correcting repeatedly occurring faults based on the corresponding points of individual maintenance operations. For example, this would make it possible to prevent maintenance operations that in the past could not correct the corresponding fault. In this way, the quality of the generated maintenance information can be additionally improved such that the proportion of inadvertently removed and completely faultless system components can be lowered and the costs ultimately can be reduced.

In one preferred additional development of the method according to the invention, the maintenance information is dynamically modified such that a singular detection of a fault does not result in the maintenance information to continue statically specifying the replacement of a once determined system component. This provides the particular advantage that, for example, defects or faults that cannot be corrected by replacing a system component do not constantly result in the same maintenance information. Consequently, potential errors can be avoided and costs can be reduced by continuously and dynamically redetermining maintenance information to be transmitted.

In another advantageous additional development of the method according to the invention, replaced system components are automatically determined. This provides a number of advantages for the generation of maintenance information because the maintenance team does not have to enter revised system component data into a configuration system, but the central maintenance system rather is able to automatically locate changed system components within the aircraft. Combined with the ability of being informed about existing faults or failures by systems, the central maintenance system is designed for automatically determining whether or not the replacement of a component corrected a fault by utilizing the method according to the invention. For example, if a system component within a system is replaced due to a fault being detected and the central maintenance system determines that a system component was replaced and the replacement did not correct the fault, the rating of the system component replacement can be automatically adapted by reducing the corresponding point rating. However, if the replacement of the system component corrects the fault, the corresponding point rating for the respective system component replacement can be automatically increased with the method according to the invention.

In a particular additional development of the method according to the invention, it is preferred to exchange data between the individual system components and a higher-order system component—such as a control unit, wherein the data contains, for example, identification data of the corresponding system components and their function. This could be realized, for example, with an RFID tag in connection with one or more RFID scanners. In one special scenario, for example, all system components of a system could be realized with RFID tags that enable the higher-order system to detect the presence of the system components or to register their removal. For example, if a system component with a first RFID tag is removed from the system and a system component of the same type with a second RFID tag is installed, the system is able to determine that the [first] RFID tag and consequently the respective system component is no longer arranged within the system. A new identification on the second RFID tag is simultaneously transmitted to the control unit or the like such that it is able to detect that a new system component has been integrated. If the identification data also contains, for example, function-identifying data, the control unit can determine that the first system component with a corresponding functionality has been replaced with a second system component with the same functionality. The rating scheme according to the above-described embodiments automatically can be dynamically adapted by correlating data on replaced system components and the discontinuation or the occurrence of faults.

In an advantageous additional development of the method according to the invention, the configuration system dynamically determines the system components of the system. The configuration system transmits the dynamically obtained configuration data to the central maintenance system. If faults occur, this central maintenance system is able to generate corresponding maintenance information that is dynamically adapted to the incoming configuration data and the fault data communicated by central control units.

The object of the invention is furthermore met by a use of a central maintenance system according to the invention in an aircraft, as well as with an aircraft comprising at least one such maintenance system.

BRIEF DESCRIPTION OF THE FIGURES

Other characteristics, advantages and potential applications of the present invention result from the following description of the exemplary embodiment and the figures. In this respect, all described and/or graphically illustrated characteristics form the object of the invention individually and in arbitrary combinations, namely regardless of their composition in the individual claims or their references to other claims. In the figures, identical or similar objects are furthermore identified by the same reference symbols. In these figures:

FIG. 2 shows an exemplary listing of potential faults of a simple system;

FIG. 3 shows an exemplary rating table;

FIG. 4 shows an exemplary initial rating table of a system;

FIG. 5 shows an exemplary enhanced initial rating table;

DETAILED DESCRIPTION OF THE FIGURES

Figure 1A:
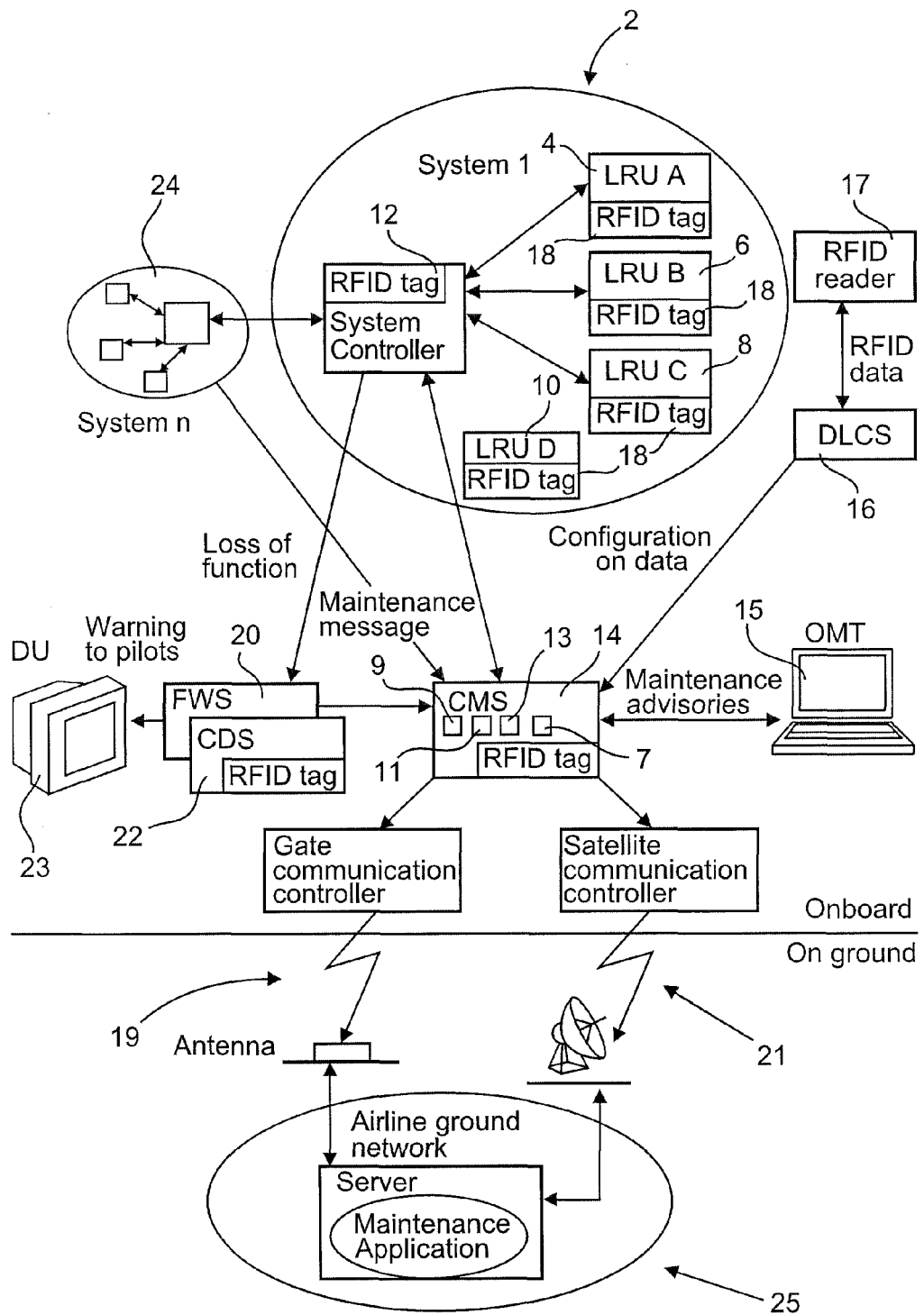
FIG. 1a to FIG. 1d show a schematic overview of a central maintenance system according to the invention and its individual system components, as well as interacting devices.

FIG. 1a shows a system 2 with several system components 4, 6, 8 and 10 that are identified with "LRU" ("Line Replaceable Unit") A-D. These individual system components 4 to 10 are controlled by a central control unit 12 (also referred to as "System Controller" below and in FIG. 1) in order to jointly provide desired system functions. It cannot be ruled out that individual system components 4 to 10 could develop a defect or fault that [lead to] an incorrect function of the entire [system].

FIG. 1a furthermore shows a central maintenance system 14 according to the invention that is connected to the central control unit 12 and able to communicate with this central control unit. In this case, the data transmitted between the central control unit 12 and the central maintenance system 14 may comprise, in particular, the operatability of the system 2 and of the individual system components 4 to 10. To this end, it is preferred that the central control unit 12 is able to monitor the function of the individual system components 4 to 10 or to at least send fault data to the central maintenance system 14. The central maintenance system comprises an arithmetic unit 9 that is provided with a central processor unit 11, a random access memory 13 and input/output means 7.

The central maintenance system 14 is connected to an on-board maintenance terminal 15, also referred to as "Onboard Maintenance Terminal (OMT)", which is adapted for transferring information about maintenance actions to be conducted to maintenance personnel.

At this point, it should be noted that the exemplary system illustration in FIG. 1a should not be interpreted such that the different system components 4 to 10 can only be used parallel to one another. In fact, it would be conceivable that the individual system components 4 to 10 respectively consist of interacting subcomponents that could also have defects. Likewise, the system components 4 to 10 can also be connected in series such that faults of one of the system components 4 to 10 that interacts with other system components 4 to 10 cannot necessarily be readily allocated to this respective system component. Accordingly, it can also occur that faults detected by the central control unit 12 result in an ambiguous selection of system components 4 to 10 to be replaced. This is the reason why the central control unit 12 may indicate several potentially defective system components to the central maintenance system 14, in which case said components need to be treated accordingly by a maintenance team.

FIG. 1a furthermore shows a configuration system 16 that is designed for storing the configuration of the system 2 in the form of data, as well as for retrieving and making available said data to other systems or system components.

In the example shown, the configuration system 16 is furthermore designed for exchanging identification data with the different system components 4 to 10 or other system components that are not illustrated for reasons of simplicity. In a particularly advantageous additional development, this is realized by scanning RFID tags 18 that are arranged, for example, on the system components 4 to 10. The configuration data of the configuration system 16 can be made available to the central maintenance system 14 on demand. The configuration system 16 may furthermore be connected to an RFID scanner 17 that is designed for scanning the RFID tags 18 of the system components 4 to 10.

FIG. 1*a* furthermore shows a warning system 20 for pilots, as well as a central display system 22 that is connected to at least one display unit 23 such as a monitor. The warning system 20 and the display system 22 with its display unit 23 serve for informing a pilot about detected faults that could possibly be critical. In a preferred example, the warning system 20 that is also referred to as "Flight Warning System" (FWS) enables a pilot to send control information to the central maintenance system 14 in order to possibly prioritize or the like different maintenance information, if so required.

The central maintenance system 14 serves for providing a maintenance team with processed maintenance information such that maintenance operations can be better planned and also accelerated. The central maintenance system 14 is preferably designed for providing a maintenance team on the ground with the dynamically generated maintenance information that directly leads to the replacement of corresponding system components in the aircraft via a corresponding interface and a corresponding output device.

Furthermore data link means 19 and 21 are shown that can establish and operate a link between a database unit 25 and the central maintenance system 14 in order to import or export maintenance strategies between the central maintenance system 14 and the database unit 25. For example, the database unit 25 could be realized in the form of a server that can communicate with central maintenance systems of aircraft with ground support, for example, with a ground network of an aircraft operator via wireless or wire-bound links It should furthermore be noted that the central maintenance system 14 is not only able to communicate with a single system 2 and to detect corresponding faults, but also to monitor a second system 24 and other systems that are not illustrated in FIG. 1*a*.

Figure 1B:
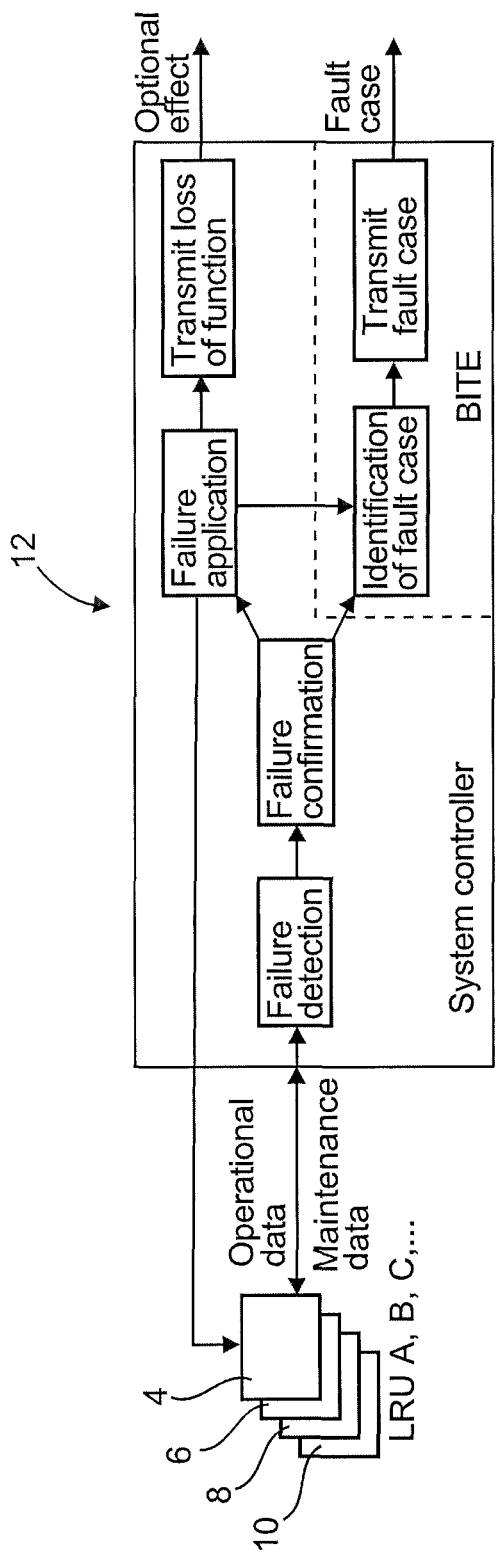
Figure 1C:
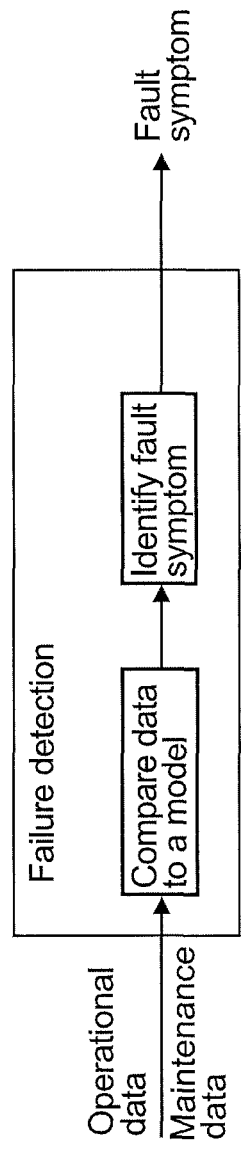

The functions that can be carried out by a central control unit 12 are elucidated with reference to FIG. 1*b*. The central control unit could be designed for identifying faults of system components 4 to 10 by comparing operational data with a model (see FIG. 1*c*). This procedure is described below with reference to an example.

It is assumed that a system component consists of an intelligent sensor that digitally communicates with the central control unit.

The intelligent sensor comprises an internal microprocessor and an internal memory and could be designed for detecting internal faults such as: memory overflow, memory faults, watchdog faults, internal power supply faults, exceeding an internal temperature or the like. In this case, the intelligent sensor could send the detected fault to the central control unit, namely by optionally utilizing a special protocol for maintenance data. Such maintenance data may contain an identification of the fault symptom and can be directly evaluated with respect to fault symptoms by an identification function of the central control unit.

Operational data sent from the system components to the central control unit normally contain a set of parameters in connection with validity data of these parameters. The parameters are monitored by the central control unit and a fault of the system component could be detected in case these values do not lie within a predefined range. In this case, the validity data of the parameters could contain additional information for the central control unit such as, e.g., information on a predefined range of values being exceeded:

i. this behavior could be linked to an internal fault in the central control unit or the maintenance system connected thereto;

ii. this behavior could furthermore be linked to missing data originating from another system component X that is directly connected, e.g., in series to the respective system component. Due to the missing data of the system component X, the respective system component is unable to generate reliable data and for this reason sends a parameter to the central control unit that could be provided with the validity information "invalid parameter due to invalid input data." In this case, the central control unit will recognize that the determined fault does not lie in the respective system component, but rather a system component X connected thereto.

Different mechanisms can be implemented for the actual fault detection:

defining ranges for input parameters that originate from other system components and evaluating parameters that do not lie within these ranges as indication of a fault of the respective system components;

monitoring the validity information of input parameters of the system components;

defining complex system models including fault detection algorithms that provide the option of checking the consistency of all input and output parameters of the system in real time.

It would also be possible to wait for automatic verifications of the fault that arrive within certain predefined time intervals in order to filter out brief deviations of the operational data. Subsequently, determined faults and potential functional defects are output in the form of corresponding data.

Figure 1D:
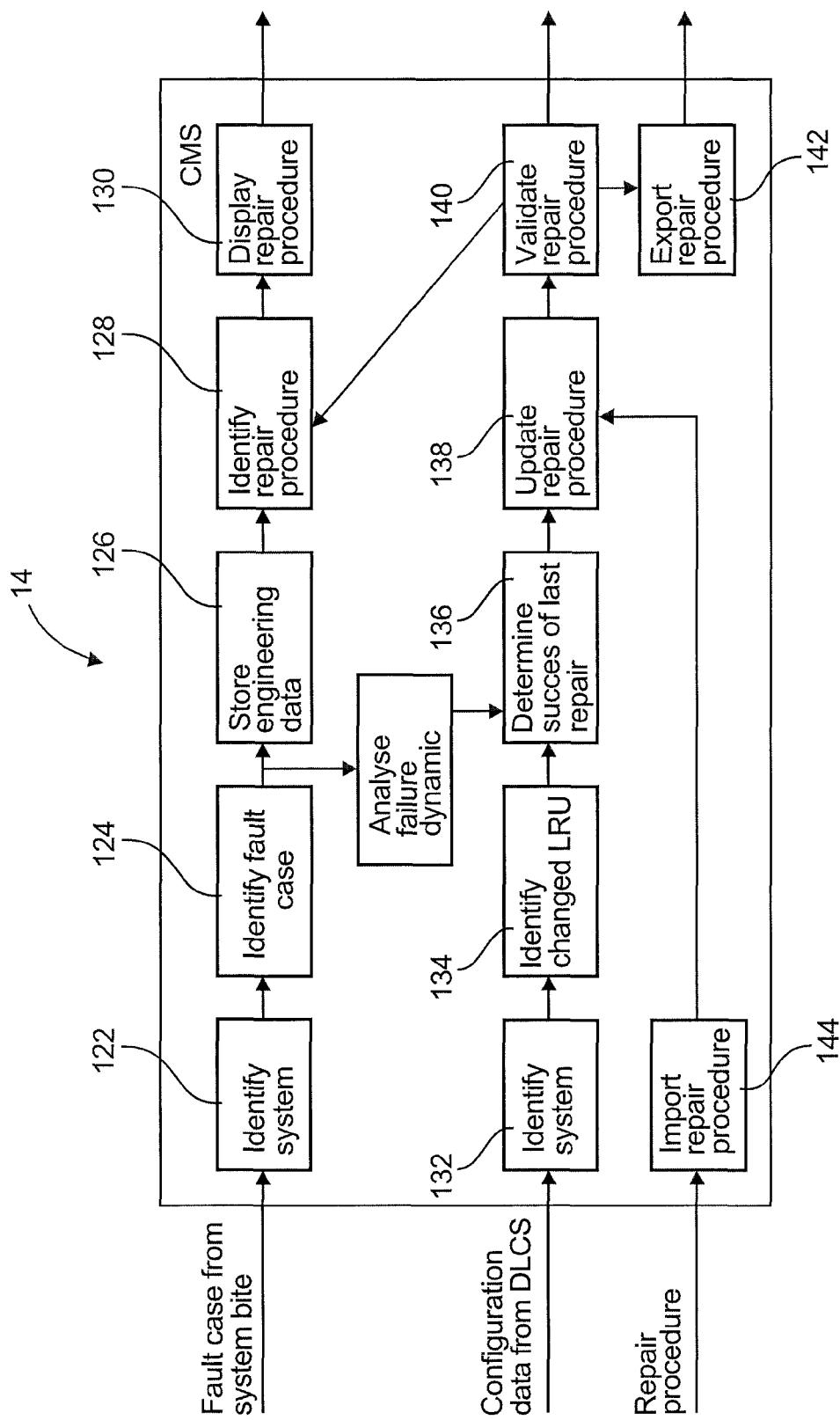

In addition, the basic function of the central maintenance system according to the invention is elucidated in the form of a block diagram in FIG. 1*d*.

The respective system is identified 122 based on a determined fault that is transmitted from a central control unit 12 of a system to the central maintenance system 14. This could be followed by the identification 124 of the communicated fault that could be read out of a fault table. The central maintenance system 14 could be designed for storing 126 fault data, wherein the fault data preferably can be linked with occurring or occurred faults. This could be followed by the identification 128 of a maintenance operation that leads to the display 130 of maintenance information.

The central maintenance system 14 could furthermore be designed for identifying 132 the respective system based on the configuration data of the configuration system 16. The incoming dataset could make it possible to determine 134 whether a system component in the respectively identified system has been replaced. This simultaneously makes it possible to determine 136 whether a fault that occurred prior to the replacement was corrected by replacing the system component. This determination of a performed replacement can be realized by comparing the dataset of the configuration system 16 with a previously received dataset or by identifying an identification number or the like that represents a performed replacement of a system component in the respective dataset. Subsequently, the central maintenance system could update 138 a rating table, in which faults are correlated with successful and unsuccessful maintenance operations. The central maintenance system according to the invention is furthermore designed for prompting maintenance personnel to validate 140 a determined change of a maintenance strategy after a rating table has been updated.

Ultimately, the central maintenance system 14 according to the invention could furthermore be designed for exporting 142 maintenance strategies and updated rating tables with the correlation of successful and unsuccessful maintenance operations, as well as fault, to an external database unit 25, central maintenance systems of other composite systems and the like. In case the aspects of the invention are used in commercial aircraft, it would be conceivable to transfer data from an onboard central maintenance system of a commercial aircraft to a database unit on the ground that, in turn, is designed for comparing maintenance strategies of several commercial aircraft with one another and therefore is able to communicate particularly promising maintenance strategies to all commercial aircraft connected to the database unit. The central maintenance system according to the invention could accordingly be updated 144 by externally supplied data.

In order to simplify the transmission of faults from the central control unit 12 to the central maintenance system 14, the corresponding fault messages may have a suitable format. It would be possible, for example, to transmit a set of five individual parameters for each fault message:

1) BITE ID: this parameter is used for identifying a system that sends the fault message. In this case, BITE stands for "Built In Test Equipment" and is unique for each system. It is consequently desirable that a system 2 has a different BITE ID than the second system 24 according to FIG. 1.
2) Fault code: the fault code identifies the fault determined by the central control unit 12. With respect to the determination of the fault code, we refer to the further description.
3) Time: the time, at which the fault occurred.
4) Technical data: fault context data can be recorded in the technical data.
5) New set: this parameter could be realized, for example, in the form of a Boolean parameter that instructs the central maintenance system 14 to record technical data if it has the value 1. On the other hand, setting the new set parameter to "0" could instruct the central maintenance system to not record the technical data. Technical data preferably is only recorded to a limited degree in order to save memory space. For example, the technical data of a fault could be successively recorded three times and the new set parameter could subsequently be set to "0."

The data transmitted from the configuration system 16 to the central maintenance system 14 preferably also has a certain structure. It could be sensible to transmit at least three parameters in a dataset:

1) BITE ID: parameter for identifying the system (see above).
2) FIN: a FIN is a function identification number that is unique for each system component in an aircraft. Accordingly, a FIN is a code that defines and describes the function and the location of an aircraft component. The allocation of a FIN makes it possible to simplify and carry out the processing of a dataset or maintenance information electronically because unique identification numbers make it possible to minimize incorrect descriptions or incorrect interpretations of descriptions.
3) Time: the time, in which a system component was replaced.

The following figures are described in greater detail with this basic information.

FIG. 2 shows a fault table, in which operational effects 26 and fault symptoms 28 of different faults 30 are illustrated. The table in FIG. 2 therefore should be interpreted as a matrix of sorts, in which functional failures are listed in the form of operational effects 26 that in connection with the fault symptoms 28 lead to a number of different potential faults 30. The information on the operational effects 26 and the fault symptoms 28 may be obtained from already existing documents that could be known, for example, from a central maintenance system according to the state of the art. The correlation between the different fault symptoms 28 and the operational effects 26 leads to different faults 30 that are unique for each fault just like the function identification numbers (FIN). In this way, the description of an occurring fault by the central control unit 12 is significantly simplified because it is merely required to convert the detected faults into a fault number that is subsequently transmitted to the central maintenance system 14 with the aid of a table of the type illustrated in FIG. 2. Alternatively, it would also be possible that the central control unit 12 only provides information on which operational effects 26 have been detected, and that the central maintenance system 14 generates or determines corresponding fault numbers based on this information.

The described measures therefore make it possible to respectively describe occurring faults, as well as all system components within an aircraft, with a number or a defined term such that the processing of faults and system components in databases, arithmetic units or the like is significantly simplified.

FIG. 3 shows an exemplary rating table that is intended to demonstrate how successively occurring faults and the following system component replacements result in different ratings of replacement processes. The table in FIG. 3 has nine columns. In the first column 32, only the time sequences are numbered. The occurring faults identified in the central maintenance system 14 are listed in the second column 34. The third column 36 contains the replacement process, after which the fault disappeared. The fourth to seventh columns 38 to 44 contain point ratings for the first system component 4, the second system component 6, the third system component 8 and another "wiring" system component. Resulting maintenance information is shown in the eighth column 46. Alternative replacement processes or other maintenance operations are shown in the ninth column 48.

An initial rating 50 is shown in the first line. In this case, the first system component 4 has a point rating of "1" while the second system component 6 (column 40), the third system component 8 (column 42) and the wiring (column 44) respectively have "0." If a fault occurs, the initial rating 50 would result in maintenance information (column 46) that suggests the replacement of the first system component 4 (column 38). Due to the initial rating of "0" for the remaining system components, the corresponding maintenance information does not contain any alternative maintenance or replacement suggestion.

In the next line 52, the occurred fault is recorded in the second column 34, wherein this fault is designated as "FC1" in this case. In the third column 36, it is recorded that the fault disappeared after the first system component 4 (LRU A) was replaced. This results in the point rating for the replacement of this first system component to be increased, for example, by 2 in column 38. Consequently, the initial value "1" shown in line 50 results in "3" in line 52. The point rating for the remaining system components 6 and 8, as well as the wiring, still remains at "0" in columns 40-44. Since the first system component 4 has the highest point rating, maintenance information suggesting the replacement of the first system component 4 results in column 46. Since all remaining system components merely have a point rating of "0," column 48 also does not contain an alternative maintenance suggestion in line 52.

Line 54 and column 36 show that the occurred fault could not be corrected until the second system component 6 was replaced. Consequently, the point rating for the first system component 4 needs to be decreased in column 38, for example, in the form of a reduction by 1. Column 40 shows an increase in the point rating for the replacement of the second system component 6 by 2. The remaining system components always have the same point rating "0." Since the replacement of the first system component 4 and the replacement of the second system component 6 has an identical point rating, the maintenance information in column 46 specifies "replacement of first system component 4 and second system component 6." There are no alternative maintenance suggestions.

If the fault is subsequently corrected by replacing the first system component 4, line 56 shows that the point rating for the first system component 4 is once again increased by 2, the point rating for the second system component 6 is decreased by 1 and the remaining system components have a point rating of "0." If the fault occurs again, the new maintenance information consequently specifies "replacement of the first system component 4." Since one system component now has a point rating that is lower than that of another system component, but greater than "0," column 48 for the first time contains an alternative maintenance suggestion in line 56. Accordingly, the method according to the invention is able to determine based on previous replacements of a second system component 6 that, in principle, the first system component 4 probably needs to be replaced, but that it would also be possible (however with lower probability) that a replacement of the second system component 6 is required in order to correct the occurred fault.

Other instances, in which either the replacement of the first system component 4, the replacement of the second system component 6 or the replacement or maintenance of a wiring (see column 44) resulted in a fault being corrected, are described in the following lines 58-70. Accordingly, the central maintenance system 14 "learns" from previous faults and can adapt the maintenance information accordingly (see column 46). Consequently, it is not statically predetermined, for example, that the first system component 4 needs to be replaced if fault XY occurs, but each occurring fault rather results in the history of exactly this fault being reevaluated in order to obtain the most accurate information possible on which maintenance operation could result in the fault being corrected. In the example shown, this could also result in the suggestion to merely inspect the wiring, as well as the alternative possibility of a replacement of the second system component 6 or the first system component 4, in lines 64 and 66.

In columns 38-44, the point ratings are modified in the exemplary fashion shown such that possible algorithm errors during the determination of new point ratings do not result in system components that might be incorrectly considered as being defective to be directly suggested as a system component specified to be replaced in a next maintenance step. Due to the above-described distribution of the points, each system component requires at least two successful maintenance operations in order to include this system component in the maintenance information in a next rating step. This increases the safety and the reliability of the central maintenance system.

The parameters entered into column 36 not only can be obtained manually, but also automatically by replacing system components and subsequently determining that no fault is found. The replaced system component can be identified, for example, with RFID technology as described above in the introduction to the description and illustrated in FIG. 1.

The central maintenance system may furthermore have a few functions that make it easier to "clean up" the history of maintenance operations. For example, all point ratings that have the value "1" and are older than one year can be set to "0." In addition, the alternative suggestions can be sorted after certain time entries.

FIG. 4 shows that the central maintenance system comprises an initial system rating table with different maintenance suggestions for all possible faults and point ratings for all system components in the system. In this case, column 72 shows the different faults, columns 74-90 show the initial point ratings for all the different system components, column 90 shows the different maintenance suggestions for the individual faults in column 72, and column 94 shows alternative maintenance suggestions.

FIG. 5 shows an enhanced system point rating table that is similar to that illustrated in FIG. 4, but contains different point ratings in columns 74-90. The table in FIG. 5 represents an exemplary enhancement of a table according to FIG. 4, into which different maintenance histories of one or several aircraft were incorporated. For example, if an airline has several aircraft of the same type and the central maintenance systems 14 of the aircraft respectively produce different point ratings for the various systems, the rating tables of several or all aircraft can be combined into an enhanced system rating table according to FIG. 5. If additional aircraft of the same type are commissioned, for example, the central maintenance systems can be provided with a system rating table according to FIG. 5 such that the experiences gained from several aircraft and many maintenance operations can already be integrated into the new aircraft. This has the advantage of additionally reducing the costs associated with a conventional maintenance system that outputs static maintenance information or even a central maintenance system according to the invention that was not yet subjected to a learning process.

Figure 6:
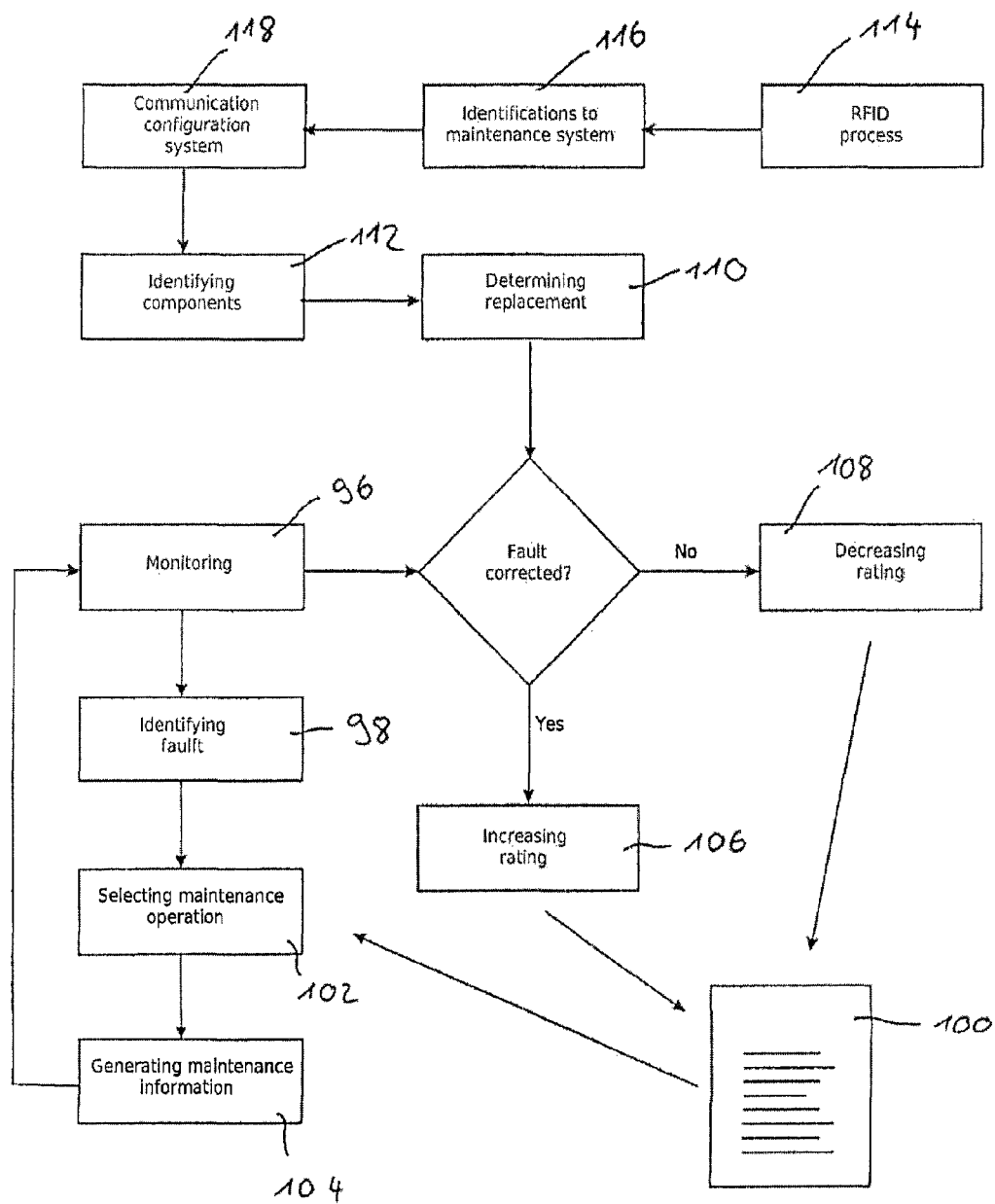
FIG. 6 shows a schematic overview of the method according to the invention.

FIG. 6 shows an overview of the method according to the invention. The system 14 is monitored 96 for faults. If a fault occurs, it is identified 98 and a maintenance operation 102 is selected with a rating table 100. Subsequently, maintenance information is generated 104. After the maintenance operation has been carried out, the rating of the performed maintenance operation is adapted to the status of the fault after the maintenance operation by correspondingly increasing 106 or decreasing 108 the rating. A possible replacement of system components is preferably determined 110, but identification 112 of the currently installed system components is required for this purpose. To this end, the system components of the system could be determined, e.g., by means of an RFID process 114, in which at least one RFID scanner and RFID tags arranged on the system components are utilized. The determined system components may respectively have a specific identification that could be transmitted 116 to a maintenance system. The communication with the configuration system then makes it possible to identify 112 the currently installed system components. This in turn makes it possible to determine 110 the replacement of system components.

The described method can be carried out continuously or on demand such that the monitoring of the respective system is continued after generating 104 maintenance information.

Figure 7:
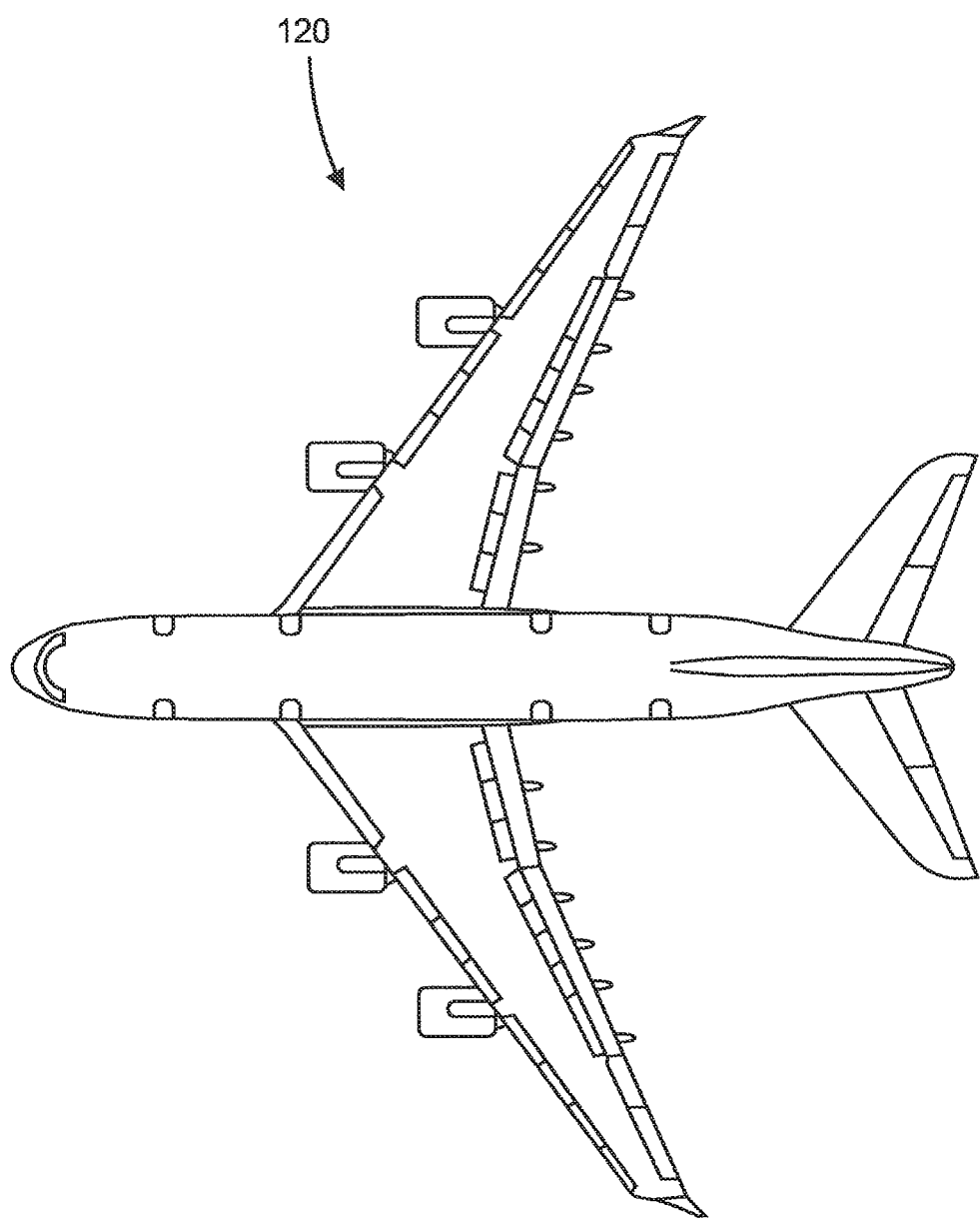
FIG. 7 shows an aircraft with a maintenance system according to the invention.

FIG. 7 ultimately shows an aircraft 96 with at least one central maintenance system 14 according to the invention.

As a supplement, it should be noted that "comprising" does not exclude any other elements or steps, and that "a" or "an" does not exclude a plurality.

REFERENCE SYMBOLS

2 System
4 System component (LRU)
6 System component (LRU)
7 Input/output means
8 System component (LRU)
9 Arithmetic unit
10 System component (LRU)
11 Central processor unit
12 Central control unit
13 Random access memory
14 Central maintenance system
15 Maintenance terminal
16 Configuration system
17 RFID scanner
18 RFID tag
19 Data link means
20 Warning system
21 Data link means
22 Display system
23 Display unit
24 System
25 Database unit
26 Operational effects
28 Fault symptoms
30 Faults
32 Column: time sequence
34 Column: faults
36 Column: replacement operation and disappearing fault
38 Column: point rating
40 Column: point rating
42 Column: point rating
44 Column: point rating
46 Column: maintenance information
48 Column: alternatives
50 Line: initial rating
52 Line: operation
54 Line: operation
56 Line: operation
58 Line: operation
60 Line: operation
62 Line: operation
64 Line: operation
66 Line: operation
68 Line: operation
70 Line: operation
72 Column: faults
74 Column: point rating
76 Column: point rating
78 Column: point rating
80 Column: point rating
82 Column: point rating
84 Column: point rating
86 Column: point rating
88 Column: point rating
90 Column: point rating
92 Column: maintenance information
94 Column: alternatives
96 Monitoring
98 Fault identification
100 Rating table
102 Selecting maintenance operation
104 Generating maintenance information
106 Increase rating
108 Decrease rating
110 Determining replacement of system components
112 Identification of system components
114 RFID process
116 Transmitting identifications of system components to maintenance system
118 Communication with configuration system
120 Aircraft
122 Identifying
124 Identifying
126 Storing
128 Identifying
130 Displaying
132 Identifying
134 Determining replacement
136 Updating
138 Validating
140 Validating
142 Exporting
144 Updating

The invention claimed is:

1. A maintenance system for generating maintenance information on at least one system that contains several system components, comprising
at least one arithmetic unit; and
at least one input/output means;
wherein the maintenance system is configured for receiving operational data of a system from a central control unit of the system;
wherein the maintenance system is configured for identifying a fault of a system component based on the operational data;
wherein the maintenance system is configured for comparing the identified fault with predefined known faults;
wherein the maintenance system is configured for retrieving already performed or predefined maintenance operations that are correlated to the known faults from a random access memory, as well as for selecting and outputting as maintenance information a maintenance operation that is correlated to the identified fault in order to correct the fault; and
wherein the maintenance system is further configured for determining the replacement of a system component and the correction of an identified fault.

2. The maintenance system of claim 1, further configured for identifying the fault of the system component by comparing fault data of the central control unit received via the input/output means or operational data of the central control unit with known fault data or operational data that is linked to faults and made available in the maintenance system.

3. The maintenance system of claim 1, further configured for being connected to a maintenance terminal in order to output maintenance information.

4. The maintenance system of claim 1, further configured for identifying by the arithmetic unit whether a system component has been replaced by comparing operational data received via the input/output means with older operational data.

5. A method for planning maintenance operations of a system, comprising the steps:
monitoring the system for faults;
generating, by a processor, maintenance information that contains information on a maintenance operation to be carried out if a fault occurs, wherein a maintenance operation that is correlated to the occurred fault and has the highest rating is selected from a rating table;
monitoring the system for replacement of system components as well as the correction of an identified fault subsequently; and adapting the rating of the performed maintenance operation in the rating table in dependence on the status of the fault after the maintenance operation.

6. The method of claim 5, wherein every potential maintenance operation has a point rating in the rating table, wherein the point rating of a maintenance operation for correcting a fault is increased or decreased depending on the status of the fault after carrying out the maintenance operation.

7. The method of claim 6, wherein at least one maintenance operation has a point rating other than zero in the rating table.

8. The method of claim 5, wherein the point rating of a maintenance operation for an occurred fault is increased if the maintenance operation results in correcting the fault.

9. The method of claim 5, wherein the point rating of a maintenance operation for an occurred fault is decreased if the maintenance operation does not result in correcting the fault.

10. The method of claim 5, wherein the method is carried out dynamically and continuously.

11. The method of claim 5, wherein a central maintenance system determines the replacement of a component of the system.

12. The method of claim 11, wherein the central maintenance system determines the presence of all components of the system.

13. The method of claim 12, wherein the system components of the system comprise an identification that is transmitted to the central maintenance system.

14. The method of claim 11, wherein the central maintenance system identifies the system components of the system by means of an RFID scanner and RFID tags arranged on the system components.

15. The method of claim 5, wherein the central maintenance system communicates with a configuration system and data on system components installed in the system is transmitted.

16. A vehicle with a maintenance system for generating maintenance information on at least one system that contains several system components, comprising at least one arithmetic unit; and at least one input/output means;

wherein the maintenance system is configured for receiving operational data of a system from a central control unit of the system;

wherein the maintenance system is further configured for identifying a fault of a system component based on the operational data;

wherein the maintenance system is further configured for comparing the identified fault with predefined known faults;

wherein the maintenance system is further configured for retrieving already performed or predefined maintenance operations that are correlated to the known faults from a random access memory, as well as for selecting and outputting as maintenance information a maintenance operation that is correlated to the identified fault in order to correct the fault; and wherein the maintenance system is configured for determining the replacement of a system component and the correction of an identified fault.

* * * * *